United States Patent
Barbeau et al.

(10) Patent No.: US 7,196,718 B1
(45) Date of Patent: Mar. 27, 2007

(54) METHOD AND APPARATUS FOR TRANSMISSION OF DIGITAL IMAGE TO DESTINATION ASSOCIATED WITH VOICE CALL PARTICIPANT

(75) Inventors: Pierre Barbeau, Leawood, KS (US); Yat-Sang Hung, San Diego, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 94 days.

(21) Appl. No.: 10/945,201

(22) Filed: Sep. 20, 2004

Related U.S. Application Data

(60) Provisional application No. 60/605,025, filed on Aug. 26, 2004.

(51) Int. Cl.
*H04N 7/14* (2006.01)

(52) U.S. Cl. ............... 348/14.02; 348/14.01; 370/352

(58) Field of Classification Search .. 348/14.01–14.16; 379/93.17, 93.23, 142.01, 142.04; 455/415; 370/352
See application file for complete search history.

(56) References Cited

U.S. PATENT DOCUMENTS

| | | | |
|---|---|---|---|
| 5,327,144 A | 7/1994 | Stilp et al. | 342/387 |
| 5,386,117 A | 1/1995 | Piety et al. | 250/330 |
| 5,402,171 A | 3/1995 | Tagami et al. | 348/219.1 |
| H1717 H * | 4/1998 | Stoudt et al. | 257/431 |
| 5,748,484 A | 5/1998 | Cannon et al. | 364/479.03 |
| 5,806,005 A | 9/1998 | Hull et al. | 455/566 |
| 5,943,603 A | 8/1999 | Parulski et al. | 725/133 |
| 6,011,967 A | 1/2000 | Wieck | |
| 6,278,884 B1 | 8/2001 | Kim | |
| 6,282,362 B1 | 8/2001 | Murphy et al. | 386/46 |
| 6,317,609 B1 * | 11/2001 | Alperovich et al. | 348/14.01 |
| 6,344,853 B1 | 2/2002 | Knight | 345/629 |
| 6,359,837 B1 | 3/2002 | Tsukamoto | 368/10 |
| 6,396,537 B1 | 5/2002 | Squilla et al. | 348/239 |

(Continued)

FOREIGN PATENT DOCUMENTS

DE  199 13 019 A 1  2/2001

(Continued)

OTHER PUBLICATIONS

Xeni Jardin, "Phonecam Nation." (Document recites it was posted on Jun. 10, 2003. Document was printed from the World Wide Web.).

(Continued)

*Primary Examiner*—Stella Woo

(57) ABSTRACT

A method and apparatus for transmitting a digital image correlated with a phone number to a destination after placing a voice call with the phone number. The method involves (i) maintaining data that correlates phone numbers with digital images, (ii) placing a voice call between a telephone which maintains the data and a device operating under the phone number, (iii) using the data to identify a digital image correlated with the phone number involved in the voice call, and (iv) sending the digital image from the telephone to a destination associated with the phone number. The apparatus may be a camera phone that includes an image-capturing segment, a communication interface, a processor, data storage, and program-logic for carrying out the function of transmitting a digital image correlated with a phone number to a destination, after placement of a voice call with the phone number.

23 Claims, 5 Drawing Sheets

U.S. PATENT DOCUMENTS

| | | | |
|---|---|---|---|
| 6,449,485 B1 | 9/2002 | Anzil | 455/456.1 |
| 6,507,362 B1 | 1/2003 | Akerib | 725/109 |
| 6,573,927 B2 | 6/2003 | Parulski et al. | 348/32 |
| 6,636,259 B1 | 10/2003 | Anderson et al. | 348/211.3 |
| 6,657,661 B1 | 12/2003 | Cazier | 348/231.2 |
| 6,741,864 B2 | 5/2004 | Wilcock et al. | 455/456.1 |
| 6,833,861 B2 | 12/2004 | Matsumoto et al. | 348/207.2 |
| 6,853,461 B1 | 2/2005 | Shiimori | 358/1.15 |
| 6,862,045 B2 | 3/2005 | Morimoto et al. | 348/515 |
| 6,911,992 B2 | 6/2005 | Bronstein et al. | 345/629 |
| 6,912,398 B1 | 6/2005 | Domnitz | 455/461 |
| 6,914,626 B2 | 7/2005 | Squibbs | 348/231.3 |
| 6,941,276 B2 | 9/2005 | Haeberli | 705/26 |
| 2002/0054224 A1 | 5/2002 | Wasula et al. | 348/232 |
| 2002/0137528 A1 | 9/2002 | Fraccaroli | 455/457 |
| 2003/0007616 A1* | 1/2003 | Alves et al. | 379/142.14 |
| 2003/0137422 A1 | 7/2003 | Nishibori | 340/573.1 |
| 2003/0202101 A1 | 10/2003 | Monroe et al. | 348/156 |
| 2003/0206316 A1 | 11/2003 | Anderson et al. | 358/1.18 |
| 2004/0015191 A1 | 1/2004 | Otman et al. | 607/5 |
| 2004/0185900 A1 | 9/2004 | McElveen | |
| 2004/0204202 A1 | 10/2004 | Shimamura et al. | |
| 2004/0240434 A1* | 12/2004 | Sato et al. | 370/352 |
| 2005/0105705 A1* | 5/2005 | Elcock et al. | 379/142.01 |
| 2005/0250534 A1 | 11/2005 | Maurer | |
| 2005/0287997 A1* | 12/2005 | Fournier | 455/415 |
| 2006/0033809 A1* | 2/2006 | Farley | 348/14.02 |
| 2006/0050536 A1 | 3/2006 | Kim et al. | |

FOREIGN PATENT DOCUMENTS

| | | |
|---|---|---|
| WO | WO 00/75859 | 12/2000 |
| WO | WO 01/86511 A2 | 11/2001 |

OTHER PUBLICATIONS

TheKansasCityChannel.com, "Teen Uses Camera Phone to Thwart Apparent Abduction." (Document recites it was posted on Aug. 1, 2003. Document was printed from the World Wide Web.).

"Camera Phone Hang-up." (Document was posted on the World Wide Web at least as early as Dec. 23, 2003. Document was printed from the World Wide Web.).

"What to do when you're in an Accident." (Document was posted on the World Wide Web at least as early as Feb. 18, 2004. Document was printed from the World Wide Web.).

Audio Device, Covert Tracking System, http://www.spyshopusa.com/Tracking_S.htm, printed from the World Wide Web on Apr. 1, 2002.

Technical Metadata for Digital Still Images—National Information Standards Organization (NISO), http://www.niso.org/committees/committee_au.html, printed from the World Wide Web on Apr. 25, 2002.

Portelligent, Epson Location Organizer with Camera & GPS Performance and Design Analysis, Report #140-991020-1b, 2000.

Harvard University Library: Digital Repository Service (DRS), "DRS Documentation—Administrative Metadata for Digital Still Images," v.1.2, Feb. 20, 2002.

Cat-Photo Standard 2.0 Tags, Cat-Photo Information, http://www.cat-photo.sourceforge.net/standard/tags.html, printed from the World Wide Web on Apr. 23, 2002.

Trimble Navigation Ltd.—GPS Software—ODELCO, Media Mapper, http://www.odelco.com/TRIMBLE/mmapper.htm, printed from the World Wide Web on Apr. 1, 2002.

"Datum Unveils Breakthrough Timing Technology for Telecommunications, Enterprise and OEM Applications," Press Release dated Feb. 8, 1999.

EOM Archives, http://www.eomonline.com/Common/Archives/November%2098/g2.htm, printed from the World Wide Web on Apr. 2, 2002.

EndRun Technologies, CDMA Timing Technology: No Antenna Hassle, http://www.endruntechnologies.com/cdma.htm, printed from the World Wide Web on Feb. 19, 2002, reprinted in full on Mar. 6, 2003.

EndRun Technologies, "Praecis Ce—OEM Time & Frequency Engine," printed on Apr. 4, 2002.

It's a camera, a PDA, a phone! It's Origami!, http://www.nwfusion.com/columnists/2001/1126cooltools.html, printed from the World Wide Web on Apr. 1, 2002.

IBM, "IBM 340 MB Microdrive—Transforming Storage Technology," 1998.

Digital Imaging Group, Inc., "DIG35 Specification—Metadata for Digital Images," Version 1, Aug. 30, 2000.

Digital Imaging Group, Inc. "DIG35 Specification—Metadata for Digital Images," Version 1.1 Working Draft, Apr. 16, 2001.

I3A-DIG35, "Metadata Standards a Smarter Way to Look at Digital Images," http://www.i3a.org/i_dig35.html, printed from the World Wide Web on Apr. 29, 2002.

Overview, GPS Photo Link, http://www.geospatialexperts.com/gpl/help/overview.html, printed from the World Wide Web on Apr. 29, 2002.

Image Archive, http://ocean.ucc.ie/00/hanrahag/minipro/html, printed from the World Wide Web on Apr. 29, 2002.

Microsoft Windows Platform Development, "MetaData in Image Files and GDI+," http://www.microsoft.com/hwdev/tech/display/GDIplus_Metadata.asp, printed from the World Wide Web on Apr. 29, 2002.

NISO Draft Standard, "Data Dictionary—Technical Metadata for Digital Still Images," Working draft, 1.0, Jul. 5, 2000.

Praecis Ce, OEM Time & Frequency Engine, EndRun Technologies, Nov. 14, 2000, pp. 1-2.

Symmetricom—Symmetricom's Breakthrough clock technology uses CDMA signals for timing the network edge, http://www.symmetricom.com/news/020899.html, printed from the World Wide Web on Aug. 8, 2002.

JC Labs, Inc.—HSC-500 x2 Camera, http://www.jclabs.com/hsc-500.html, printed from the World Wide Web on Feb. 25, 2002.

Meteor-II/MC, http://www.fabrimex.ch/meteor-i1.htm, printed from the World Wide Web on Feb. 25, 2002.

EndRun Technologies—Products—CDMA Technology, http:www.endruntechnologies.com/cdma.htm, printed from the World Wide Web on Aug. 8, 2002.

EndRun Technologies; Benefits of GPS vs. CDMA, http://www.endruntechnologies.com/gps-cdma.htm, printed from the World Wide Web on Jan. 18, 2002.

Point Grey Research, Dragonfly, IEEE-1394 Digital Camera, printed from the World Wide Web on Sep. 5, 2002.

* cited by examiner

METHOD AND APPARATUS FOR TRANSMISSION OF DIGITAL IMAGE TO DESTINATION ASSOCIATED WITH VOICE CALL PARTICIPANT

BACKGROUND

1. Field of Invention

The present invention relates to telephones and, more particularly, to the transmission of digital images from a telephone.

2. Description of Related Art

Advancements in camera technology have made digital cameras an increasingly popular alternative to conventional film-based cameras. Digital cameras do not require film to capture images. Instead, digital cameras capture images by allowing light to pass through a series of lenses to focus the light at an image sensor. The image sensor is a semiconductor device that captures an image electronically as an array of pixels. A pixel is the smallest picture element of a digital image. A digital camera produces a digital representation of each pixel and stores the digital representation of each pixel in a storage medium such as a flash memory card. Digital cameras may include a liquid crystal display (LCD) screen that allows a user to immediately view images captured by the image sensor without having to develop film as required with film-based cameras.

Advancements have also been made in telephone system technology. In a conventional land-line telephone system employing circuit switching, a conventional land-line telephone provides a means to perform voice communication with a user at another device. Circuit switching is a switching system that establishes a dedicated physical communication connection between end points, through a network, for the duration of a communication session. A conventional land-line telephone is coupled to a local exchange carrier's central office via local loop telephone lines and performs voice communications by sending and receiving analog signals via the local loop telephone lines. Coupling modems to a sending site and a receiving site in a conventional land-line telephone system is a means for sending and receiving digital data via the local loop telephone lines.

Further, conventional land-line telephones can be used to call a gateway that performs packet switching to communicate with another device. Packet switching is a switching system that establishes a physical communication connection only long enough to send/receive data packets via a network, where the data packets may travel over many diverse communication links to get to a common endpoint. One advantage of packet switching is that it can increase the communication capacity of a network as compared to a network that uses circuit switching. Packet switching technologies have led to the development of telephones (e.g. Internet Protocol telephones) that perform packet switching directly without the need to call a gateway.

Another more recent advancement in telephone system technology is the development of wireless telephones and wireless networks to provide voice and data communications from a wireless telephone to another device. A wireless telephone and wireless network provide a wireless telephone user with mobility to communicate with another device while the user moves from one location to a second location. Wireless telephones and wireless networks may employ packet switching technologies.

Modern camera technology has recently been integrated with modern telephone system technology to allow integrators to produce and market camera phones. Camera phones are a combination of a digital camera and a wireless phone. Camera phones allow for capturing images, wireless transmission of those images over a data network to a remote location, and a variety of other functions.

Methods of transmitting a digital image from a camera phone over a data network to a remote location are well known. One such method involves a camera phone establishing a packet session with a packet data serving node (PDSN) via a radio access network and sending packets of data representing (i) a captured image, and (ii) a destination identifier, via the PDSN to a network server.

A destination identifier comprises information from which a destination may be ascertained. A destination identifier could take the form of an e-mail address which represents a destination such as network server that performs e-mail functions for an account associated with the e-mail address. Alternatively, a destination identifier could take the form of a mobile identification number (MIN) which represents among other things, a destination such as a remote camera phone operating under the MIN. Other types of destination identifiers are also possible.

A network server that receives a destination identifier along with a digital image may use the destination identifier to facilitate sending the digital image to the destination represented by the destination identifier. A party with access to the destination may view the digital image sent to the destination.

Another camera phone function involving digital images is photographic caller identification. Photographic caller identification occurs by identifying the phone number of the calling phone, identifying an image associated with the phone number, and displaying the image during the phone call. Photographic caller identification thus allows a camera phone user to view an image associated with the phone number of a calling phone.

Yet another camera phone function involving digital images is photographic phone book display. Photographic phone book display is an alternative or supplement to more traditional methods of displaying a personal phone book such as a list of phone numbers, names, or memory locations. Photographic phone book display occurs by displaying images assigned to phone numbers. A phone number is selected for dialing by identifying and selecting the image associated with the phone number to be dialed. Photographic phone book display may also display the selected image during an outgoing phone call to the dialed phone number.

SUMMARY

The present invention provides a method and apparatus for transmitting a digital image correlated with a phone number to a called party during a voice call with the phone number. The called party could comprise a destination, such as an e-mail address associated with the called phone number.

In one respect, an exemplary embodiment of the invention may take the form of a method that includes the functions of (i) maintaining, in a telephone, data that correlates phone numbers with digital images, (ii) placing a voice call between the telephone and a party at a phone number, (iii) using the data to identify a digital image correlated with the phone number, and (iv) sending the digital image to the party.

In another respect, the exemplary embodiment may take the form of a method that includes the functions of (i) maintaining, in a telephone, data that correlates phone numbers with digital images, (ii) placing a voice call between the telephone and a phone number, (iii) using the data to identify a digital image correlated with the phone number, and (iv) sending the digital image from the telephone into a network, for transmission of the digital image via the network to a destination associated with the phone number. In this exemplary embodiment, the functions of (i) using the data to identify an image, and (ii) sending the digital image into the network, may occur in response to placement of the voice call.

Further, the function of sending the digital image from the telephone into the network for transmission of the digital image via the network to a destination may include sending the digital image to a network server via a packet-data connection. One way of sending the digital image to the network server via the packet-data connection includes sending the digital image via a cellular communication module to a radio access network for transmission of the digital image to the network server.

Additionally, this method could include sending a destination identifier together with the digital image to the network server, when sending the digital image into the network, to facilitate transmission of the digital image via the network to the destination. The destination identifier may take the form of a phone number, an e-mail address, or some other form.

In yet another respect, the exemplary embodiment could take the form of an apparatus that includes a communication interface for sending and receiving communications, a processor, program-logic executable by the processor, and data storage for storing the program-logic. In this exemplary embodiment, execution of the program-logic includes executing logic to (i) detect placement of a voice call between the telephone and a phone number, (ii) identify a digital image that has been correlated with the phone number, and (iii) send the digital image into a network for transmission of the digital image to a destination associated with the phone number. Execution of the program-logic to identify and send the digital image may occur in response to detecting placement of the voice call between the telephone and the phone number.

Execution of the program-logic in the exemplary embodiment may also involve (i) referring to data, in data storage, that correlates digital images with phone numbers in order to identify a digital image correlated with a phone number, and (ii) automatically sending the digital image into the network. Referring to data may include searching the data that correlates digital images with phone numbers.

In still yet another respect, the exemplary embodiment could take the form of an apparatus such as a wireless camera phone that includes (i) means for capturing digital images, (ii) means for storing digital images, (iii) means for correlating the stored digital images with phone numbers, (iv) means for placing voice calls, and (v) means for detecting placement of a voice call between the wireless camera phone and a given phone number, responsively correlating the given phone number with a given digital image of the stored digital images, and sending the given digital image into a network for transmission in turn to a destination associated with the given phone number. In this exemplary embodiment, the destination could include a remote telephone operating under the given phone number or an e-mail address derived from the given phone number.

These as well as other aspects and advantages of the invention will become apparent to those of ordinary skill in the art by reading the following detailed description, with reference where appropriate to the accompanying drawings.

Further, it should be understood that the embodiments noted in this summary are not intended to limit the scope of the invention as claimed.

BRIEF DESCRIPTION OF THE DRAWINGS

Exemplary embodiments of the present invention are described herein with reference to the drawings, in which.

DETAILED DESCRIPTION

1. Overview

Figure 1:
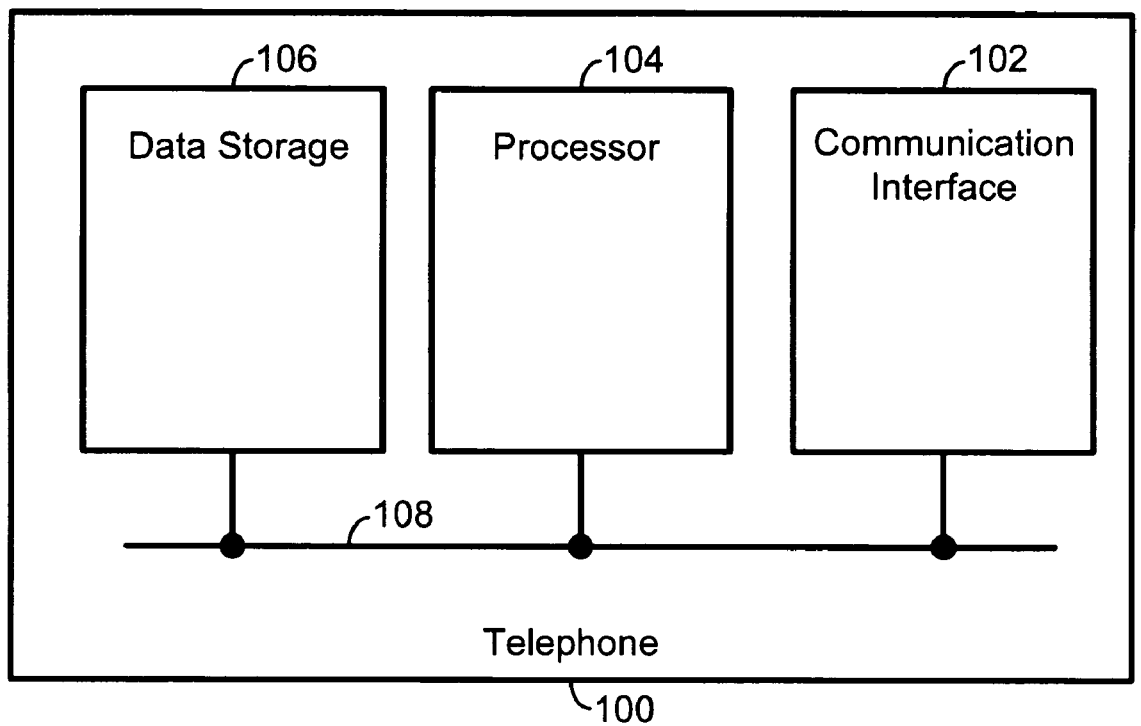
FIG. 1 is a simplified block diagram depicting an exemplary telephone.

Referring to the drawings, FIG. 1 is a simplified block diagram of an exemplary telephone 100 for carrying out the present invention. The telephone 100 includes a communication interface 102, a processor (i.e., one or more processors) 104, and data storage 106, all linked together via a system bus, network, or other connection mechanism 108.

Data storage 106 preferably stores a set of program-logic executable by the processor 104 to carry out various functions described herein. For example, the program-logic could comprise instructions for (i) capturing a digital image and storing the digital image in data storage 106, (ii) detecting when telephone 100 places a voice call to a phone number, (iii) identifying a digital image correlated with the phone number, and (iv) sending the digital image into a network for transmission of the digital image to a destination associated with the phone number.

Alternatively, various functions, including the functions above, could be carried out by hardware, software, and/or firmware (not shown in FIG. 1).

The telephone 100 may interface with a wired and/or wireless network. The telephone 100 uses communication interface 102 to send and receive communications via the wired and/or wireless network. The communication interface 102 may comprise a combination of software, hardware, and/or firmware. Examples of wired networks include a pubic switched telephone network (PSTN) and a local area network (LAN). An example of a wireless network is a radio access network (RAN). A RAN may be terrestrial such as a cellular communication network or celestial such as a satellite communication network.

Data storage 106 typically comprises computer readable medium such as magnetic discs, optical discs, organic memory, and/or any other volatile or non-volatile mass storage system readable by processor 104. In addition to program-logic, data storage 106 may store other types of data such as digital images, telephone numbers, and data that correlates digital images with telephone numbers.

The processor 104 may comprise one or more processors such as a general purpose processor and/or a digital signal processor. The processor 104 could execute the program-logic stored at data storage 106 in order to work cooperatively with the communication interface 102 to send and receive communications via a network.

2. Exemplary Architecture a. Wireless Network Architecture

Figure 2:
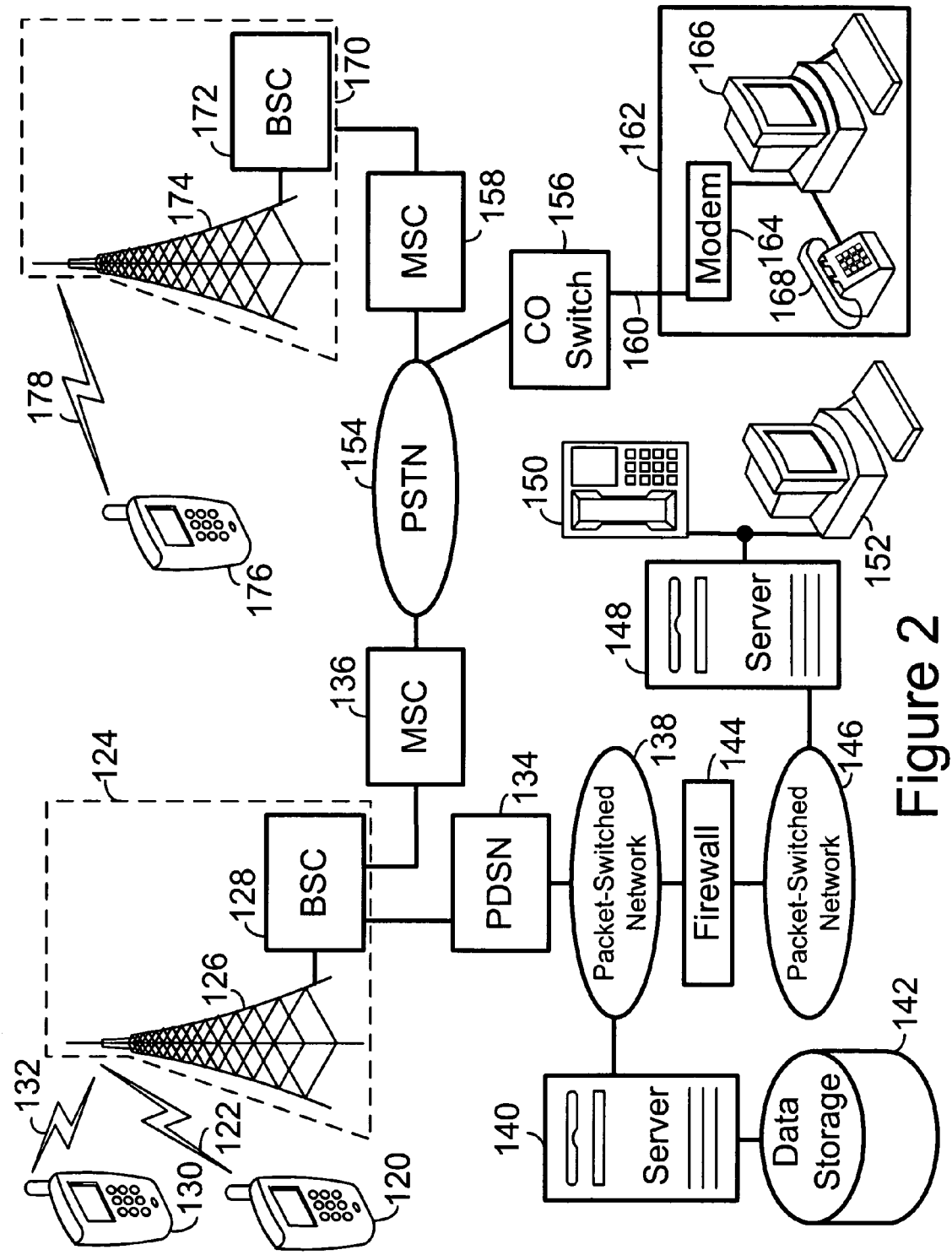
FIG. 2 is a diagram illustrating a system in which an exemplary embodiment can be implemented.

FIG. 2 provides an overview of a system for carrying out the present invention. It should be understood, however, that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

The system of FIG. 2 includes a first wireless device 120 which is arranged to communicate over a radio frequency (RF) air interface 122 with a base station 124. The first wireless device 120 may comprise a wireless camera phone. The base station 124 includes (i) a base transceiver station (BTS) 126 having an antenna for communicating with the first wireless device 120, and (ii) a base station controller (BSC) 128 which controls communication with the BTS 126.

A second wireless device 130 may also communicate with base station 124 via an RF air interface 132. The second wireless device 130 may also comprise a wireless camera phone. The first wireless device 120 and the second wireless device 130 may communicate with each other by way of base station 124 and RF air interfaces 122 and 132.

Further, the BSC 128 is coupled to a switch or gateway such as a packet data serving node (PDSN) 134 or a first mobile switching center (MSC) 136. A RAN includes the coupling mechanisms leading to various switches and gateways, along with the base station 124, and an air interface such as air interface 122.

The PDSN 134 acts as a gateway to a packet-switched network 138 operating as a wireless carrier's core network. The packet-switched network 138 may be coupled to a plurality of devices. For instance, the packet-switched network 138 may be coupled to a server 140, which in turn is coupled to data storage 142. Data storage 142 may store user messages and other types of data for the wireless carrier's customers.

Another example of a device that may be coupled to packet-switched network 138 is a firewall 144. The firewall 144 may perform network address translation (NAT) functions to allow packet-switched network 138 to communicate via another network such as a packet-switched network 146. An example of packet-switched network 146 is the Internet.

A plurality of devices may be coupled directly or indirectly to the packet-switched network 146. For instance the packet-switched network 146 may be coupled to a server 148, which in turn is coupled to a plurality of devices that access the packet-switched network 146 via the server 148. Examples of devices accessing the packet-switched network 146 via the server 148 include an Internet Protocol (IP) telephony device 150 and a personal computer 152.

The first MSC 136 performs switching functions for making connections to a PSTN 154. PSTN 154 may be coupled to a variety of devices such as a central office switch 156, located at a local exchange carrier's central office, and a second MSC 158. A local loop telephone line 160 extends from central office switch 156 to a junction box at a customer's premises 162. Additional telephone lines may be used to couple local loop telephone line 160 to a plurality of customer premises equipment such as a modem 164, a personal computer 166, and a landline phone 168.

The second MSC 158 is coupled to a base station 170 that includes a base station controller (BSC) 172 and a base transceiver station (BTS) 174. BSC 172 controls communications for BTS 174, which includes an antenna for communicating with a third wireless device 176. The third wireless device 176 may comprise a wireless camera phone. Communications between BTS 174 and the third wireless device 176 occur via an RF air interface 178.

b. Wireless Camera Phone Architecture

Figure 3:
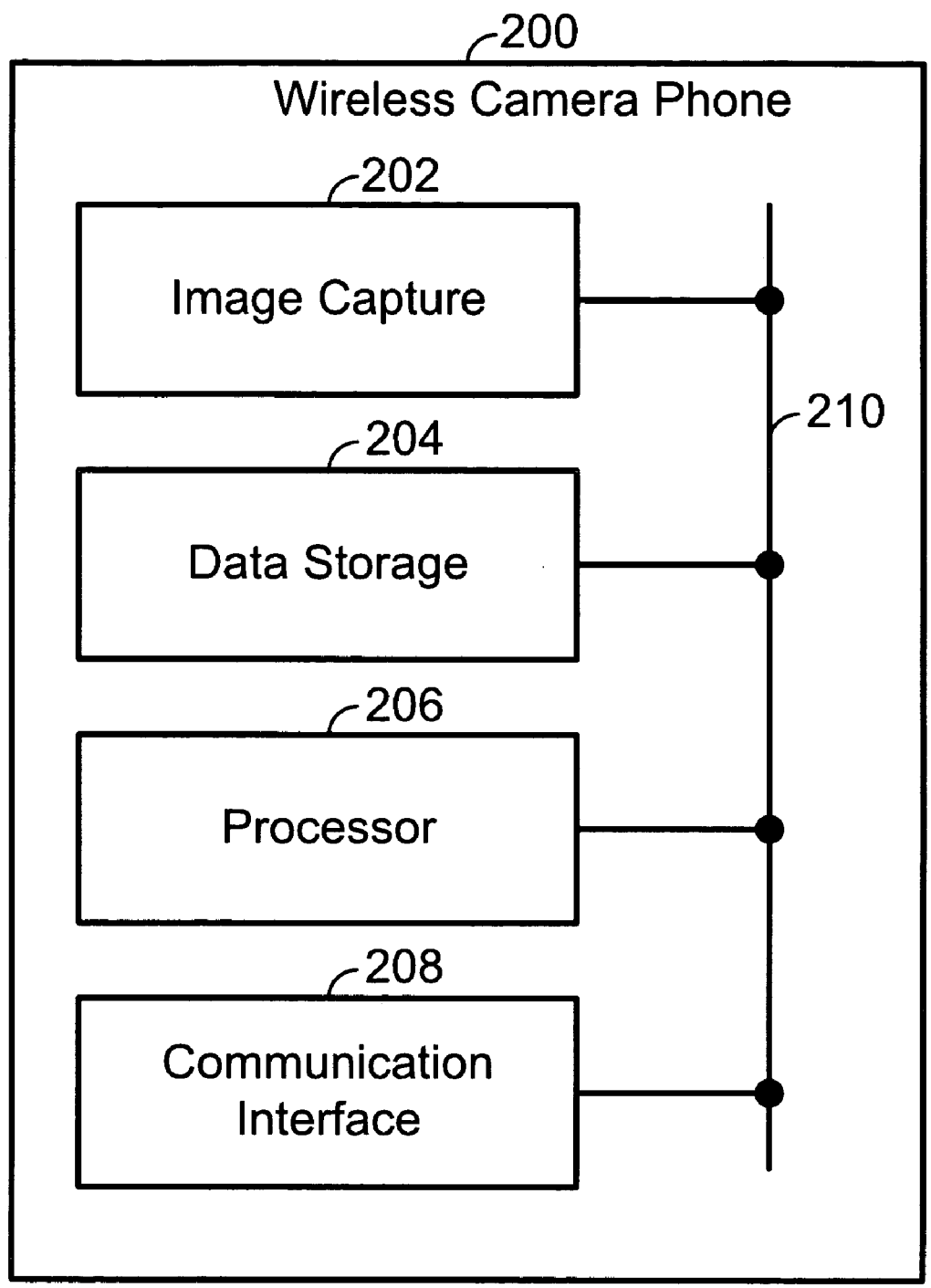
FIG. 3 is a simplified block diagram depicting an exemplary wireless camera phone.

FIG. 3 depicts a simplified block diagram of an exemplary telephone in the form of a wireless camera phone 200 for carrying out the present invention. The wireless camera phone 200 includes an image capture segment 202, data storage 204, a processor (i.e., one or more processors) 206, and a communication interface 208, all linked together via a system bus, network, or other connection mechanism 210. The first wireless device 120, the second wireless device 130, and the third wireless device 176 shown in FIG. 2 may each be arranged as the wireless camera phone 200.

The image capture segment 202 provides means for capturing digital images at the wireless camera phone 200. Preferably, the image capture segment 202 will include features typically available in a digital camera, such as a lens for focusing light from a subject being photographed, a light source for illuminating the subject, and a device for (i) detecting light from the subject, (ii) converting light to an array of electrical charges, and (iii) storing an array of values representing the array of electrical charges.

The image capture segment 202 may include an image sensor with light sensitive diodes for converting light into electrical charges. Commonly used images sensors include charge coupled device (CCD) image sensors and complementary metal oxide semiconductor (CMOS) image sensors. The image capture segment 202 may also include an analog-to-digital converter to convert the value of each electrical charge into a digital value.

The image capture segment 202 may then work cooperatively with processor 206 to (i) send an array of digital values representing the digital image to processor 206 for storage at data storage 204, or (ii) send the array of digital values directly to data storage 204. The processor 206 may execute image-capturing program-logic stored at data storage 204 to capture the digital image and store the digital image at data storage 204. As an alternative to the image capture segment 202 described above, the image capture segment 202 could comprise an optical scanner device or some device suitable for capturing digital images.

Data storage 204 provides means for storing various forms of data such as digital images, phone numbers, program-logic executable by the processor 206, and data correlating digital images with phone numbers. Data storage 204 (i.e., one or more segments of data storage) may be arranged in a variety of ways. For example, data storage 204 may include a segment of data storage integrated with the processor 206 and/or a segment of data storage arranged as removable data storage. Data storage 204 may also include other segments of data storage as well. Exemplary segments of removable data storage include (i) a compact flash memory card, (ii) a memory stick device, and (iii) a secure digital (SD) memory device.

Preferably, data storage 204 comprises computer readable medium that may include any volatile memory and/or non-volatile memory readable by the processor 206. An example of volatile memory is Random Access Memory (RAM) and an example of non-volatile memory is Electronically Erasable Programmable Read Only Memory (EEPROM). Non-volatile memory is preferred because non-volatile memory retains stored data even when power is removed from the non-volatile memory.

The processor 206 may comprise one or more processors (e.g. parallel processors), such as a general purpose microprocessor and/or a digital signal processor. The processor 206 works cooperatively with the image capture segment 202, data storage 204, and the communication interface 208 to perform various functions, in part, by executing program-logic stored at data storage 204.

The program-logic stored at data storage 204 and executable by the processor 206 may include a variety of logical instructions. Examples of logical instructions include instructions for (i) detecting placement of a voice call between the wireless camera phone 200 and a party at a given phone number, (ii) detecting placement of a voice call between the wireless camera phone 200 and a given phone number, (iii) correlating a digital image stored in data storage 204 with a given phone number stored in data storage 204, (iv) identifying a stored digital image correlated with a given phone number, and (v) sending the digital image from the wireless camera phone 200 to a called party.

Execution of logical instructions to detect placement of a voice call between the wireless camera phone 200 and a party at a given phone number or a given phone number could occur in a variety of ways. First, detecting placement of the voice call by executing logical instructions could include the processor 206 detecting initiation of the voice call. Detecting initiation of the voice call could occur by the processor 206 detecting that the wireless camera phone 200 sent a call origination message, that provides the given phone number as dialed digits, into a network. Second, detecting placement of the voice call by executing logical instructions could include the processor 206 detecting that the wireless camera phone 200 is currently engaging in a voice call and that the voice call is between the wireless camera phone 200 and a party at a given phone number or a given phone number. Other ways of detecting placement of the voice call by executing logical instructions are also possible.

Figure 4:
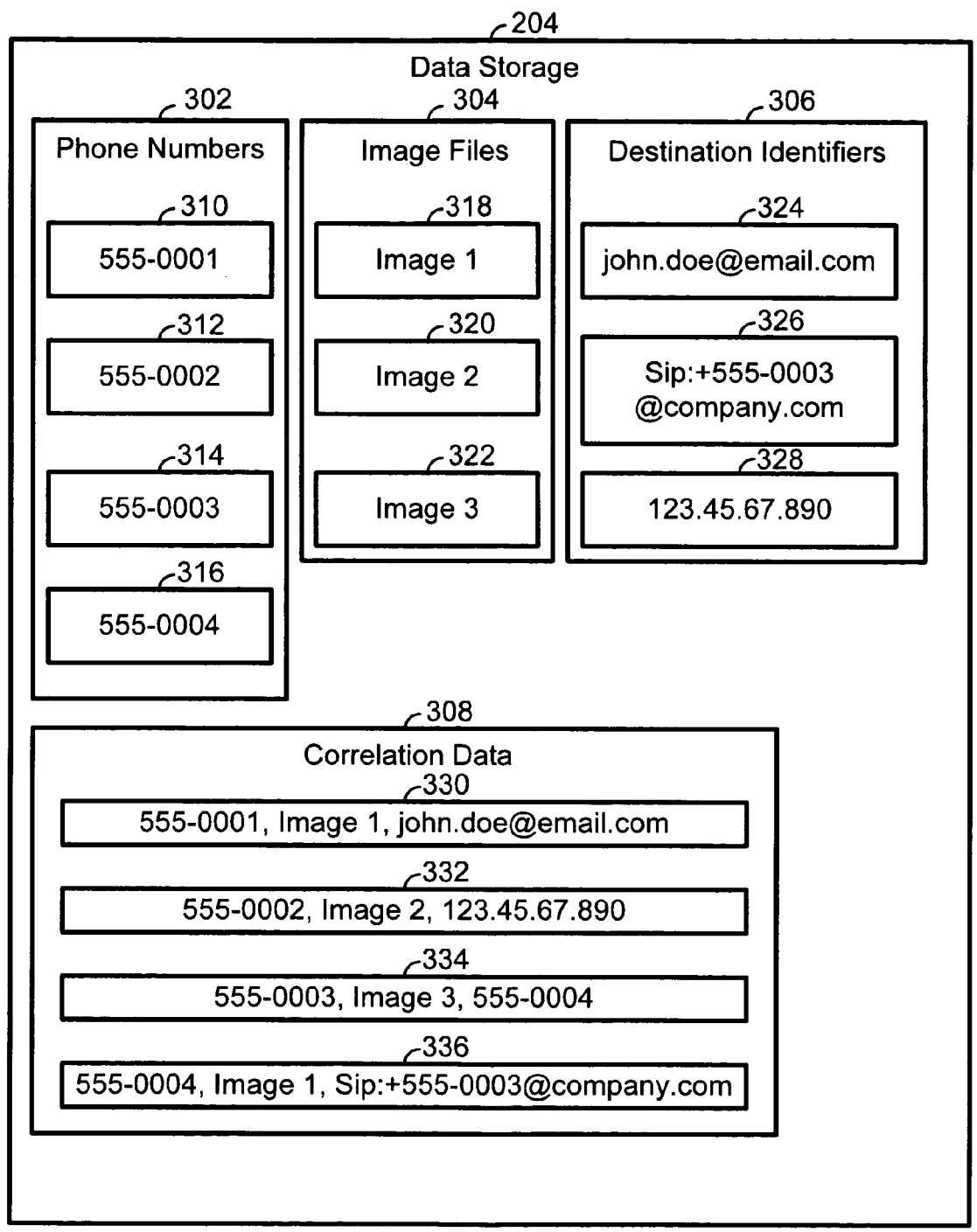
FIG. 4 is a simplified block diagram depicting a data storage device within a wireless camera phone.

Execution of program-logic to correlate a digital image stored in data storage 204 with a given phone number stored in data storage 204 may include the processor 206 creating correlation-data. Creating correlation-data could include the processor 206 combining a reference to a data image and a reference to a phone number to form the correlation-data. The reference to the data image could indicate the memory addresses of the data image and the reference to the phone number could indicate the memory addresses of the phone number and/or the phone number itself. The processor 206 could send the correlation-data to data storage 204 in order to store the correlation-data. Other ways of creating correlation-data are also possible. Examples of correlation-data are shown in FIG. 4.

Execution of program-logic to identify a stored digital image correlated with a given phone number could involve the processor 206 reading the correlation data, comparing the correlation data to the given phone number to find the given phone number in the correlation data, and then reading the correlation data to identify a stored digital image correlated with the given phone number. The processor 206 could execute the program-logic to identify a stored digital image in response to the wireless camera phone 200 detecting placement of the voice call between the wireless camera phone 200 and a given phone number.

Execution of program-logic to send the digital image from the wireless camera phone 200 to the called party facilitates transmission of the digital image to a called party. Execution of the program-logic to send the digital image may involve sending the digital image in a variety of ways. First, execution of the program-logic to send the digital image may comprise the processor 206 instructing the communication interface 208 to send the digital image from the wireless camera phone 200 to the called party during initiation of the voice call, during the voice call, or after the voice call has ended. Second, execution of the program-logic to send the digital image may comprise the processor 206 instructing the communication interface 208 to send the digital image into a network for transmission of the digital image to a destination associated with the phone number. Third, execution of the program-logic to send the digital image may comprise the processor 206 instructing the communication interface 208 to send the digital image into the network in response to the wireless camera phone 200 detecting placement of the voice call with a given phone number.

Exemplary networks that may receive the digital image sent by the wireless camera phone 200 include (i) a RAN, (ii) a packet-switched network operated by a wireless carrier, such as the packet-switched network 138 shown in FIG. 2, (iii) a packet-switched network, such as packet-switched network 146 shown in FIG. 2, and (iv) a PSTN, such as PSTN 154 shown in FIG. 2. Other types of networks are also possible for receiving the digital image.

A variety of exemplary destinations associated with a given phone number are possible. For instance a destination associated with a given phone number may be a remote device such as the third wireless device 176, the landline phone 168, the IP telephony device 150, or the server 148, all of which are shown in FIG. 2. Also, the destination associated with a given phone number could be an address of a remote device such as (i) an e-mail address, (ii) a Session Initiation Protocol (SIP) address, or (iii) an Internet Protocol (IP) address. A destination that takes the form of an address may possibly be derived from the given phone number. For example an e-mail address may be derived from a given phone number by searching a data base for the given phone number and finding the e-mail address correlated with the given phone number. The data base could be located in a network device such as at data storage 142 or could be in the wireless camera phone 200, such as in data storage 204.

Execution of the program-logic by the processor 206 may also include sending a destination-identifier with the digital image. Examples of destination-identifiers include phone numbers, e-mail addresses, SIP addresses, and IP addresses. By way of example, processor 206 may direct communication interface 208 to send a SIP address of an IP telephony device, such as IP telephony device 150, along with a digital image into a network. Destination identifiers facilitate sending a digital image to a destination by indicating the destination to a device, remote from the wireless camera phone 200, that will participate in sending the digital image to the destination.

The communication interface 208 provides means for sending and receiving communications. The communications interface 208 may send communications to other portions of the wireless camera phone 200, such as the processor 206, via the system bus 210, and to an entities external to the wireless camera phone 200. Also, the communications interface 208 may receive communications from other portions of the wireless camera phone 200, such as the processor 206, via the system bus 210, and from an entities external to the wireless camera phone 200.

Sending communications to the entities external to the wireless camera phone 200 and receiving communications from the entities external to the wireless camera phone 200 may occur via an air interface, such as air interface 122 shown in FIG. 2, or by coupling the wireless camera phone 200 to a network, such as the packet-switched network 146 via the server 148, both shown in FIG. 2.

Examples of the communications that could be received by the communications interface 208 from other portions of the wireless camera phone include a message instructing the communications interface 208 to place a voice call and a message instructing the communications interface 208 to send a digital image.

Examples of the communications that could be sent by the communications interface 208 to other portions of the wireless camera phone include a message to the processor 206 indicating that the communications interface 208 has placed a voice call in response to a message instructing the communication interface 208 to place the voice call, and a message to the processor 206 indicating that the communications interface 208 sent a digital image into a network. Other communications between the communications interface 208 and other portions of the wireless camera phone 200 are also possible.

Examples of the communications that could be received by the communications interface 208 from the entities external to the wireless camera phone 200 include messages that an incoming voice call is available and messages that a digital image has been received by the called party.

Examples of the communications that could be sent by the communications interface 208 to the entities external to the wireless camera phone 200 include (i) a digital image, (ii) a destination identifier, (iii) messages to originate a voice call between the wireless camera phone 200 and a given phone number, and (iv) messages for negotiating with a PDSN to secure a packet-data connection, such as a point-to-point protocol (PPP) link.

In response to the wireless camera phone 200 negotiating with a PDSN to secure a packet-data connection, the PDSN may assign an identification number such as a mobile IP address to the wireless camera phone 200. Upon establishing the packet-data connection, the communication interface 208 may send the processor 206 a message indicating that a secure packet-data connection has been made. The processor 206 may respond by sending one or more messages to the communications interface 208 instructing the communications interface 208 to send a digital image to a destination associated with a given phone number. The processor 206 may execute program-logic to automatically send the digital image to a network server via the packet-data connection.

The communication interface 208 of wireless camera phone 200 comprises a wireless interface, such as a cellular communication interface and/or a satellite communication interface. The processor 206 may execute program-logic stored at data storage 204 in order to send a digital image, via the cellular communication interface, to a RAN, for further transmission of the digital image to a network server.

A cellular and/or satellite communication interface may include a chipset and antenna for interfacing with a RAN via an established air interface protocol. An exemplary air interface protocol is the Code Division Multiple Access (CDMA) protocol. Other air interface protocols such as Time Division Multiple Access (TDMA), Advanced Mobile Phone System/Service (AMPS), and Global System for Mobile Communications (GSM) are examples as well. An exemplary chipset that facilitates air interface communication according to the CDMA protocol is the MSM6000™ chipset manufactured by Qualcomm Incorporated of San Diego, Calif.

The communication interface 208 may also include an interface for coupling to a network, such as the packet-switched network 146 shown in FIG. 2, by coupling to a server, such as server 148 shown in FIG. 2. An example of an interface for coupling to a network is an Ethernet network interface card.

The combination of the image capture segment 202, the data storage 204, the processor 206, and the communication interface 208, provide means for (i) capturing digital images, (ii) storing digital images, (iii) correlating the stored digital images with phone numbers, (iv) placing voice calls, and (iv) detecting placement of a voice call between the wireless camera phone 200 and a given phone number. In response to detecting placement of the voice call, the combination of the image capture segment 202, the data storage 204, the processor 206, and the communication interface 208, provide means for correlating the given phone number with a given image of the stored images, and transmitting the image into a network for transmission to a destination associated with the given phone number.

c. Data Storage Architecture

Data storage, such as data storage 106 shown in FIG. 1 and data storage 204 shown in FIG. 3, provides means for storing various forms of data, such as digital images, phone numbers, data correlating digital images with phone numbers, and destination identifiers associated with a given phone number. Data storage may also store other types of data. FIG. 4 is a simplified block diagram depicting exemplary blocks of data that may be stored at data storage 204 in the exemplary wireless camera phone 200.

In FIG. 4, data storage 204 includes various blocks of data including a phone number block 302, an image-file block 304, a destination-identifier block 306, and a correlation-data block 308. Data storage 204 may include additional or fewer blocks of data to store digital images, phone numbers, data correlating digital images with phone numbers, and destination identifiers. Data storage 204 may also store data in other and/or additional ways.

A block of data could include a single set of consecutive memory addresses within data storage 204 or more than one set of consecutive memory addresses within data storage 204 where there are intervening memory addresses between the more than one set of consecutive memory addresses.

The phone number block 302 is shown to include a first phone number (555-0001) 310, a second phone number (555-0002) 312, a third phone number (555-0003) 314, and a fourth phone number (555-0004) 316. Each phone number stored in the phone number block could be a number of digits less than, greater than, or equal to the seven digits shown representing the first, second, third, and fourth phone numbers 310, 312, 314, 316.

Further, the first, second, third, and fourth phone numbers 310, 312, 314, 316 may be stored in the phone number block 302 using a standard code. An exemplary standard code is the American Standard Code for Information Interchange (ASCII) standard which is a standard for representing certain alphanumeric characters and non-alphanumeric characters, such as "−", "@", and "+", with a seven bit binary number ranging from 0000000 to 1111111. Alternatively, or in addition to a standard code, the first, second, third, and fourth phone numbers 310, 312, 314, 316 may also be stored using a non-standard code, such as an application specific code.

The image-file block 304 includes a first image 318, a second image 320, and a third image 322. The first, second, and third images 318, 320, 322 may be stored using one of a variety of image storing formats. Examples of image storing formats include the Joint Photographic Experts Group (JPEG) format, the Portable Network Graphics (PNG) format, and the Graphic Interchange Format (GIF) format. Other examples of image storing formats are possible as well.

The destination-identifier block 306 includes a first destination identifier (john.doe@email.com) 324, a second destination identifier (Sip:+555-0003@company.com) 326, and a third destination identifier (123.45.67.890) 326. The first destination identifier 324 comprises an e-mail address. The second destination identifier 326 comprises a SIP address. And the third destination identifier 328 comprises an IP address. The first, second, and third destination identifiers 324, 326, 328 may be stored in the destination-identifier block 306 using the ASCII standard code or some other standard or non-standard code for representing data.

The correlation-data block 308 includes a first set of correlation-data 330, a second set of correlation-data 332, a third set of correlation-data 334, and a fourth set of correlation-data 336. The correlation-data block 308 is one example of data that correlates digital images with a phone number. Other examples of data that correlate digital images with a phone number are also possible.

The first set of correlation-data 330 correlates the first phone number 310 with the first image 318 and the first destination identifier 324. An exemplary use of the first set of correlation-data 330 is (i) the wireless camera phone 200 placing a voice call with a phone number stored as the first phone number 310, (ii) the wireless camera phone 200 searching the correlation-data block 308 and finding the first set of correlation-data 330 that includes the first phone number 310, and (iii) the wireless camera phone 200 sending the first image 318 and the first destination identifier 324, associated with the first phone number 310 in the first set of correlation data 330, into a network, such as the packet-switched network 138 shown in FIG. 2.

The first destination-identifier (john.doe@email.com) 324 identifies a location associated with the first phone number 310, such as a location where server 148 resides. In this regard, server 148 may be a server operated by an Internet service provider having an e-mail account identified as john.doe@email.com. The network may use the first destination-identifier 324 in order to transmit the first image 318 to the location associated with the first phone number 310, such as a location where server 148 resides.

The second set of correlation-data 332 correlates the second phone number 312 with the second image 320 and the third destination-identifier 328. An exemplary use of the second set of correlation-data 332 is (i) the wireless camera phone 200 placing a voice call with a phone number stored as the second phone number 312, (ii) the wireless camera phone 200 searching the correlation-data block 308 and finding the second set of correlation-data 332 that includes the second phone number 312, and (iii) the wireless camera phone 200 sending the second image 320 and the third destination identifier 328, associated with the second phone number 312 in the second set of correlation data 332, into a network, such as the packet-switched network 138 shown in FIG. 2.

The third destination-identifier (123.45.67.890) 328 identifies a location associated with the second phone number 312, such as a location where server 140 resides. In this regard, server 140 may be a server operated by the wireless carrier providing service to the wireless camera phone 200. The network may use the third destination-identifier 328 to transmit the second image 320 to the location associated with the second phone number 312, such as a location where server 140 resides.

The third set of correlation-data 334 correlates the third phone number 314 with the third image 322 and the fourth phone number 316. An exemplary use of the third set of correlation-data 334 is (i) the wireless camera phone 200 placing a voice call with a phone number stored as the third phone number 314, (ii) the wireless camera phone 200 searching the correlation-data block 308 and finding the third set of correlation-data 334 that includes the third phone number 314, and (iii) the wireless camera phone 200 sending the third image 322 and data representing the fourth phone number 316 into a network, such as the packet-switched network 138 shown in FIG. 2. In this regard, the network may use the data representing the fourth phone number 316 to send the third image 322 to a device operating under the fourth phone number 316. An example of a device operating under the fourth phone number 316 may be the third wireless device 176. The third wireless device 176 is a mobile device operable at many locations, and therefore, the location to which the network sends the third image 322 depends on the location of the third wireless device 176.

The fourth set of correlation-data 336 correlates the fourth phone number 316 with the first image 318 and the second destination identifier 326. An exemplary use of the fourth set of correlation-data 336 is (i) the wireless camera phone 200 placing a voice call with a phone number stored as the fourth phone number 316, (ii) the wireless camera phone 200 searching the correlation-data block 308 and finding the fourth set of correlation-data 336 that includes the fourth phone number 316, and (iii) the wireless camera phone 200 sending the first image 318 and the second destination identifier 326, associated with the fourth phone number 316 in the fourth set of correlation data 336, into a network, such as the packet-switched network 138 shown in FIG. 2.

The second destination-identifier (SIP:+555-0003) 326 identifies a location associated with the fourth phone number 316, such as a location where a device operating under the third phone number 314 resides. In this regard, a device operating under the third phone number may be the IP telephony device 150. The network may use the second destination identifier 326 in order to transmit the first image 318 to the location associated with the fourth phone number 316, such as a location where a device operating under the third phone number 314 resides.

3. Exemplary Operation

As noted above, in accordance with an exemplary embodiment, a telephone will (i) store data that correlates a phone number with a digital image, (ii) place a voice call with a party at the phone number, (iii) identify a digital image correlated with the phone number, and (iv) send the digital image to the called party, such as to a destination address associated with the called phone number.

Figure 5:
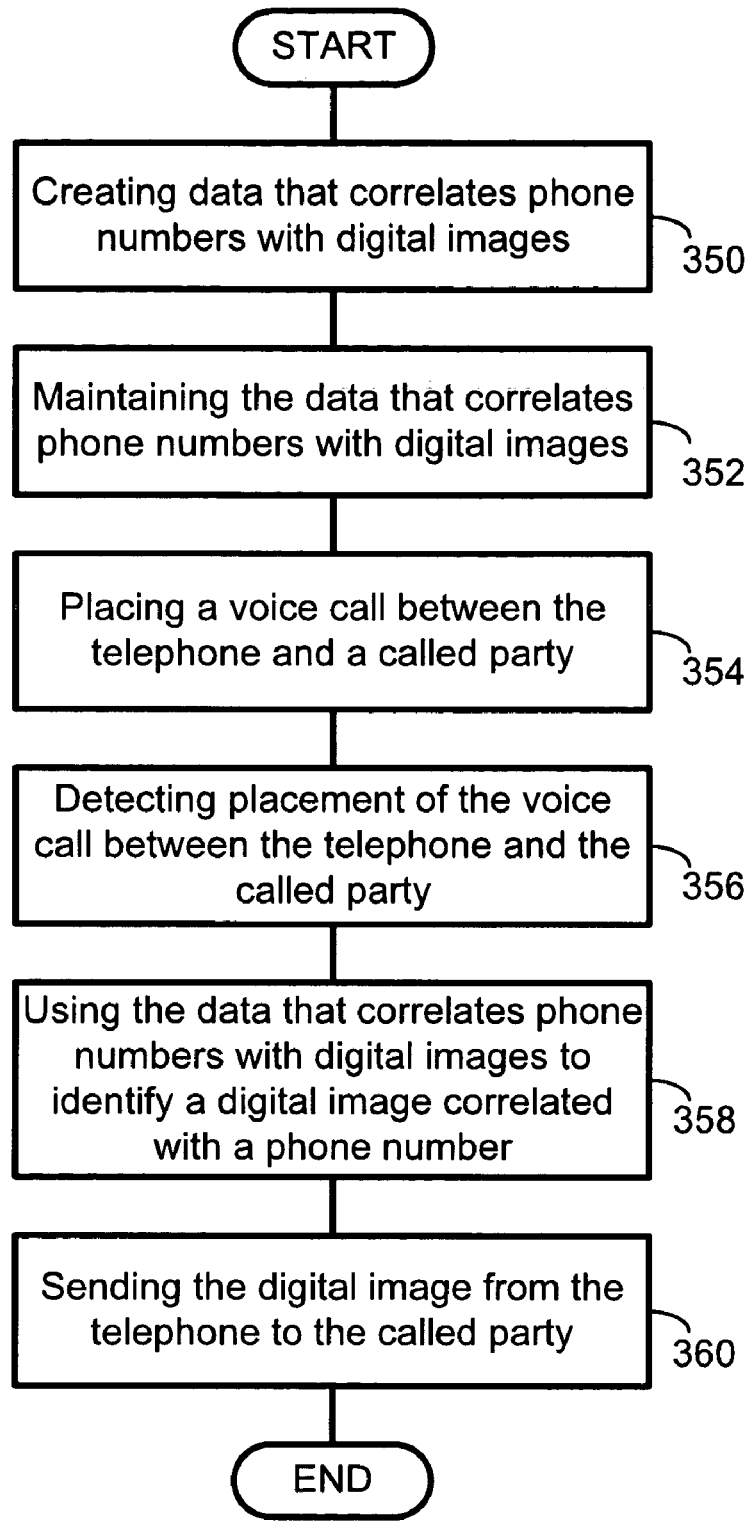
FIG. 5 is a flow chart depicting functions that can be carried out in accordance with an exemplary embodiment.

FIG. 5 is a flow chart provided to illustrate some of the functions that could be carried out in accordance with the exemplary embodiment. The functions shown in FIG. 5 could occur in a sequence from top to bottom as shown in FIG. 5 or in another sequence.

Block 350 involves creating data that correlates phone numbers with digital images. Creating the data that correlates phone numbers with digital images may occur in various ways. Creating the data that correlates phone numbers with digital images could involve processor 206 executing program-logic to correlate a digital image with a phone number, as described above with respect to the wireless camera phone architecture.

Creating the data that correlates phone numbers with digital images could also include a telephone user selecting a digital image stored in data storage 204 and then entering a phone number, or a telephone prompting the telephone user to enter a phone number immediately upon the telephone capturing a digital image. Entering a phone number could occur in a variety of ways such as speaking the phone number, speaking a voice tag associated with the phone number, pressing telephone buttons to enter the phone number, or selecting a phone number from a list of phone numbers stored in data storage 204.

After the data has been created at Block 350, Block 352 involves maintaining the data that correlates phone numbers with digital images. Maintaining the data that correlates phone numbers with digital images could occur in a variety of ways. For example, maintaining the data could involve storing the data in data storage 204 after creation of the data, as well as continuing to store the data in data storage 204 after the digital image has been sent to the called party.

Maintaining the data could also involve arranging the data in data storage 204 in such a way that the data may be searched after storing the data in data storage 204. The correlation-data block 308 shown in FIG. 3 is an example of arranging data as sets of correlation-data so that a processor 206 can search distinct sets of data that correlate a phone number and a digital image. A processor searching distinct sets of data could involve a processor 206 reading the first, second, third, and fourth sets of correlation-data 330, 332, 334, 336 and identifying a sets of correlation-data for a given phone number, such as the first set of correlation data 330 that includes the first phone number (555-0001) 310 and the first image 318.

Block 354 involves placing a voice call between the telephone and a called party. The called party could comprise a given phone number. Also, the called party could comprise a party that uses a remote device, such as a remote telephone, suitable for participating in voice calls. The remote device could comprise a device operating under the given phone number.

The remote device operating under the given phone number could be a remote device coupled to a local loop telephone line which is assigned the given phone number. A local exchange carrier operating a central office switch coupled to the local loop telephone line is typically responsible for assigning the given phone number to the local loop telephone line. Alternatively, the remote device operating under the given phone number could be a remote device that has been programmed with the given phone number, such as a mobile identification number (MIN), and registered with a mobile switching center, such as MSC 136, in order to participate in voice calls. Other ways that a remote device can operate under the given phone number are also possible.

Placing the voice call between the telephone 100 and the called party could include the telephone 100 producing dual-tone multi-frequency (DTMF) tones recognizable by a central office switch, such as central office switch 156, and the central office switch functioning with a network, such as the PSTN 154, to set up the voice call between the telephone 100 and the called party.

Alternatively, placing the voice call between the telephone (wireless camera phone 200) and the called party could include the wireless camera phone 200 initiating the voice call by sending a call origination message that includes dialed digits representing the given phone number to a base station, such as base station 124, and the base station forwarding the call origination message to a mobile switching center which functions to set up the voice call between the wireless camera phone 200 and the called party. Other ways of placing a voice call between the telephone and the called party are possible.

Block 356 involves detecting placement of the voice call between the telephone and the called party. Detecting placement of the voice call could occur in a variety of ways. For example, detecting placement of the voice call could occur by executing logical instructions to detect placement of the voice call as described above with respect to the exemplary wireless camera phone architecture.

Alternatively, processor 206 could detect placement of a voice call to the called party by detecting execution of logical instructions to perform speech recognition of a speech command to initiate a voice call between the telephone and the called party. Examples of speech commands that could be recognized to initiate a voice call include commands such as speaking the name of the called party, or speaking "call" or "dial" immediately prior to speaking a phone number of the party to be called. Other speech commands that could be recognized to initiate a voice call between the telephone and the called party are also possible.

Additionally, the telephone 100 could detect placement of a voice call between the telephone 100 and a called party by the processor 104 detecting that telephone 100 sent DTMF tones to the central office switch in order to initiate placement of the voice call between the telephone 100 and the called party. In this regard, the DTMF tones represent the phone number of the given party. Other ways of detecting placement of the voice call between the telephone 100 and the called party are also possible.

Next at block 358, a digital image correlated with a phone number is identified by using data that correlates the phone number with the digital image. The function of using data that correlates phone numbers with digital images to identify a digital image with a phone number could include processor 206 reading and comparing the data to find a digital image correlated with a given phone number. Processor 206 could read and compare the data by executing logical instructions.

By way of example, a digital image correlated with a phone number could be identified by using data that correlates phone numbers with digital images by (i) the processor 206 executing logical instructions in order to read the first set of correlation-data 330 stored in the correlation-data block 308, (ii) the processor 206 executing logical instructions to compare the first phone number 310 of first set of correlation-data 330 to the phone number of the called party, and (iii) the processor 206 executing logical instructions to read the first set of correlation-data 330 to identify a digital image correlated with the phone number if the first phone number 310 matches the phone number of the called party. Other examples of using data that correlates phone numbers with digital images to identify a digital image correlated with a phone number are also possible.

Next, Block 360 involves sending the digital image from the telephone to the called party. Sending the digital image from the telephone to the called party could involve the execution of program-logic by processor 206 to send the digital image from the wireless camera phone 200 to the called party, as described above with respect to the exemplary wireless telephone architecture.

Execution of program-logic for sending the digital image from the telephone to the called party could also include executing instructions for sending the digital image, via a packet-data connection, to a network server, such as server 140. Sending the digital image via the packet-data connection may comprise the telephone negotiating with a PDSN, such as PDSN 134, to set up a link, such as a point-to-point protocol (PPP) link, between the telephone and the network server 140. After the telephone secures a packet-data connection and sends the digital image to the network server 140, the network server 140 may then transmit the digital image to the called party.

Sending the digital image from the telephone to the called party could also involve sending the digital image from the telephone to a destination associated with the called party. A destination associated with the called party could be a location remote from the called party or a location co-located with the called party. Examples of destinations associated with the called party include an address such as an e-mail address, a SIP address, an IP address, and a device remote from the telephone. Examples of devices remote from the telephone include (i) a first remote telephone that operates under a first phone number, where placement of the voice call is between the telephone and the first phone number, (ii) a second remote telephone that operates under a second phone number, and (iii) a server capable of receiving digital images.

Sending the digital image from the telephone to the called party could also involve the telephone deriving the destination associated with the called party from the phone number of the called party. Deriving the destination associated with the called party could involve the telephone searching data that correlates phone numbers with destinations, such as correlation data 308, and determining a destination associated with a phone number of the called party. For example, the telephone could search the correlation-data 308 for the first phone number (555-0001) 310 and derive a destination associated with the first phone number 310 by reading the first set of correlation data 330 that includes the first phone number 310 and the first destination identifier (john.doe@email.com) 324. Deriving a destination associated with the called party could also occur in a network device, such as a server, after the telephone sends the digital image and data representing the telephone number of the called party into the network for transmission to the network device.

Furthermore, sending the digital image from the telephone to the called party could involve the telephone sending a destination identifier along with the digital image. The destination identifier facilitates a network and/or a remote device, such as a network server, in sending the digital image to the called party, by informing the network and/or remote device where to send the digital image. Examples of destination-identifiers include a phone number of a remote telephone, an e-mail address, a SIP address, and an IP address. Other exemplary destination identifiers are also possible.

4. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A method comprising:
   maintaining, in a given telephone, con-elation data for one or more telephone numbers, each telephone number corresponding with a respective remote telephone, and the correlation data defining, respectively for each telephone number, (i) a corresponding digital image, and (ii) a corresponding destination-identifier indicative of an image-destination, the image-destination being other than the remote telephone that corresponds with the telephone number, wherein the maintained correlation data is created prior to placement of a given voice call between the given telephone and a given one of the telephone numbers;
   placing the given voice call between the given telephone and a given one of the telephone numbers; and
   responsive to placing the given voice call, (i) using the correlation data to identify a digital image and destination-identifier corresponding with the given telephone number, and (ii) sending the identified digital image to the image-destination indicated by the identified destination-identifier.

2. A method comprising:
   maintaining, in a given telephone, correlation data for one or more telephone numbers, each telephone number corresponding with a respective remote telephone, and the correlation data defining, respectively for each telephone number, (i) a corresponding digital image, and (ii) a corresponding destination-identifier indicative of an image-destination, the image-destination being other than the remote telephone that corresponds with the telephone number, wherein the maintained correlation data is created prior to placement of a given voice call between the given telephone and a given one of the telephone numbers;
   placing the given voice call between the given telephone and a given one of the telephone numbers; and
   responsive to placing the given voice call, (i) using the correlation data to identify a digital image and destination-identifier corresponding with the given telephone number, and (ii) sending the identified digital image from the given telephone into a network, for transmission of the identified digital image via the network to the image-destination indicated by the identified destination-identifier.

3. The method of claim 2, wherein the function of sending the digital image occurs during the given voice call.

4. The method of claim 2, wherein the image-destination indicated by the identified destination-identifier comprises a remote telephone other than the remote telephone corresponding with the given telephone number.

5. The method of claim 2, wherein the image-destination indicated by the identified destination-identifier comprises an e-mail address derived from the given telephone number.

6. The method of claim 2, wherein sending the identified digital image from the given telephone into the network for transmission of the digital image via the network to the image-destination comprises:
   sending the identified digital image via a packet-data connection to a network server, wherein the network server then transmits the digital image to the image-destination.

7. The method of claim 6, wherein the given telephone includes a cellular communication module, and wherein sending the identified digital image via the packet-data connection to the network server comprises:
   sending the digital image via the cellular communication module to a radio access network, for transmission of the digital image in turn to the network server.

8. The method of claim 6, wherein sending the identified digital image from the given telephone into the network for transmission of the digital image via the network to the image-destination further comprises:

sending the destination-identifier corresponding with the given telephone number, together with the identified digital image, to the network server.

9. The method of claim 8, wherein the destination identifier corresponding with the given telephone number is a telephone number of another remote telephone.

10. The method of claim 2, further comprising creating the correlation.

11. The method of claim 2, wherein the given telephone is a camera phone, the method further comprising:

capturing the identified digital image into the camera phone.

12. A telephone comprising:

a communication interface for sending and receiving communications;

a processor;

data storage for maintaining correlation data for one or more telephone numbers, each telephone number corresponding with a respective remote telephone, and the correlation data defining, respectively for each telephone number, (i) a corresponding digital image, and (ii) a corresponding destination-identifier indicative of an image-destination, the image-destination being other than the remote telephone that corresponds with the telephone number, wherein the maintained correlation data is created prior to placement of a given voice call between the telephone and a given one of the telephone numbers; and program-logic stored in the data storage and executable by the processor to detect placement of the given voice call between the telephone and the given one of the telephone numbers, and responsive to placement of the given voice call, (i) use the correlation data to identify a digital image and destination-identifier corresponding with the given telephone number, and (ii) send the identified digital image into a network for transmission of the digital image to the image-destination indicated by the identified destination-identifier.

13. The telephone of claim 12, further comprising:

image-capturing logic for capturing the identified digital image and for storing the identified digital image in the data storage.

14. The telephone of claim 12, wherein the image-destination indicated by the identified destination-identifier comprises a destination selected from the group consisting of (i) a remote telephone other than the remote telephone corresponding with the given telephone number, and (ii) an e-mail address derived from the given telephone number.

15. The telephone of claim 12, wherein the program-logic is executable to automatically send the identified digital image into the network.

16. The telephone of claim 12, wherein the program-logic is executable to automatically send the identified digital image via a packet-data connection to a network server.

17. The telephone of claim 16, wherein the program-logic is further executable to send the identified digital image with the destination-identifier corresponding with the given telephone number.

18. The telephone of claim 16, wherein the communication interface comprises a cellular communication interface, and wherein the program-logic is executable to send the identified digital image via the cellular communication interface to a radio access network, for transmission of the identified digital image in turn to the network server.

19. The telephone of claim 12, wherein the image-destination indicated by the identified destination-identifier comprises an address of a remote device.

20. The telephone of claim 19, wherein the address of the remote device comprises an address selected from the group consisting of: (i) an e-mail address, (ii) a Session Initiation Protocol (SIP) address, and (iii) an Internet Protocol (IP) address.

21. The telephone of claim 20, wherein the remote device comprises a IP telephony phone.

22. A wireless camera phone comprising:

means for capturing digital images;

means for storing the captured digital images;

means for maintaining correlation data for one or more telephone numbers, each telephone number corresponding with a respective remote telephone, and the correlation data defining, respectively, for each telephone number, (i) a corresponding digital image of the stored digital images, and (ii) a corresponding destination-identifier indicative of an image-destination, the image-destination being other than the remote telephone that corresponds with the telephone number, wherein the maintained correlation data is created prior to placement of a given voice call between the wireless camera phone and a given one of the telephone numbers;

means for placing the given voice call between the wireless camera phone and a given one of the telephone numbers; and means for detecting placement of the given voice call and responsively (i) using the correlation data to identify a digital image and destination-identifier corresponding with the given telephone number, and (ii) sending the identified digital image into a network for transmission in turn to the image-destination indicated by the identified destination-identifier.

23. The wireless camera phone of claim 22, wherein the image destination indicated by the identified destination-identifier comprises a destination selected from the group consisting of (i) a remote telephone other than the remote telephone corresponding with the given telephone number, and (ii) an e-mail address derived from the given telephone number.

* * * * *

UNITED STATES PATENT AND TRADEMARK OFFICE
CERTIFICATE OF CORRECTION

PATENT NO. : 7,196,718 B1
APPLICATION NO. : 10/945201
DATED : March 27, 2007
INVENTOR(S) : Pierre Barbeau and Yat-Sang Hung It is certified that error appears in the above-identified patent and that said Letters Patent is hereby corrected as shown below:

Column 15, Line 66, please delete "con-elation" and add -- correlation --.

Signed and Sealed this

Twenty-sixth Day of June, 2007

JON W. DUDAS
*Director of the United States Patent and Trademark Office*